United States Patent
Jansch

[11] Patent Number: 6,026,675
[45] Date of Patent: Feb. 22, 2000

[54] METHOD AND APPARATUS FOR TESTING THREADED JOINTS AND THREADED MEMBERS

[75] Inventor: Manfred Jansch, Garbsen, Germany

[73] Assignee: Weatherford/Lamb, Inc.

[21] Appl. No.: 09/043,005

[22] PCT Filed: Aug. 12, 1996

[86] PCT No.: PCT/GB96/01958

§ 371 Date: Feb. 28, 1998

§ 102(e) Date: Feb. 28, 1998

[87] PCT Pub. No.: WO97/09597

PCT Pub. Date: Mar. 13, 1997

[30] Foreign Application Priority Data

Sep. 2, 1995 [GB] United Kingdom ................... 9517934
Oct. 24, 1995 [GB] United Kingdom ................... 9522192

[51] Int. Cl.$^7$ ............................................. G01M 3/18
[52] U.S. Cl. .................................... 73/49.5; 73/49.1
[58] Field of Search .................. 73/46, 49.1, 49.5, 73/49.6, 40.5 R

[56] References Cited

U.S. PATENT DOCUMENTS

| | | | |
|---|---|---|---|
| 1,788,845 | 1/1931 | Reynolds | 73/46 |
| 1,931,502 | 10/1933 | Markle et al. | 73/46 |
| 2,264,515 | 12/1941 | Fear . | |
| 2,416,441 | 2/1947 | Grant et al. | 73/49.5 |
| 2,504,530 | 4/1950 | Jacobs | 73/40 |
| 2,571,236 | 10/1951 | Hamilton, Jr. | 73/46 |
| 2,731,827 | 1/1956 | Loomis | 73/40.5 |
| 2,766,614 | 10/1956 | Cook | 73/46 |
| 2,817,230 | 12/1957 | McCully | 73/46 |
| 3,000,205 | 9/1961 | Suderow | 73/46 |
| 3,038,542 | 6/1962 | Loomis | 166/204 |
| 3,071,960 | 1/1963 | Knapp et al. . | |
| 3,111,169 | 11/1963 | Hyde . | |
| 3,134,441 | 5/1964 | Barry et al. . | |
| 3,154,940 | 11/1964 | Loomis | 73/40.5 |
| 3,165,918 | 1/1965 | Loomis | 73/40.5 |
| 3,165,919 | 1/1965 | Loomis | 73/40.5 |
| 3,165,920 | 1/1965 | Loomis | 73/40.5 |
| 3,193,917 | 7/1965 | Loomis | 29/407 |
| 3,194,310 | 7/1965 | Loomis | 166/4 |
| 3,358,497 | 12/1967 | Hawk | 73/49.1 |
| 3,371,521 | 3/1968 | Hawk | 73/46 |
| 3,396,575 | 8/1968 | Sjoberg et al. | 73/40.5 |
| 3,439,740 | 4/1969 | Conover . | |
| 3,478,577 | 11/1969 | Hawk | 73/49.1 |
| 3,495,443 | 2/1970 | Phillips et al. | 73/40.5 |
| 3,503,249 | 3/1970 | Dumond | 73/49.1 |
| 3,685,544 | 8/1972 | Ball et al. | 138/90 |
| 3,762,212 | 10/1973 | Morley et al. | 73/40.7 |
| 3,795,138 | 3/1974 | Hasha | 73/46 |
| 3,800,596 | 4/1974 | Phillips et al. | 73/40.5 R |
| 3,810,383 | 5/1974 | Matherne | 73/40.5 R |
| 3,826,307 | 7/1974 | Brown et al. | 166/120 |
| 3,834,421 | 9/1974 | Daley | 138/97 |
| 3,842,659 | 10/1974 | Bacroix | 73/40.7 |
| 3,871,209 | 3/1975 | Hasha | 73/49.1 |
| 3,899,920 | 8/1975 | Matherne | 73/40.5 R |
| 3,921,437 | 11/1975 | Hawk | 73/40.5 R |
| 3,949,596 | 4/1976 | Hawk | 73/40.7 |
| 3,975,945 | 8/1976 | Hauk et al. | 73/46 |
| 4,010,633 | 3/1977 | Hasha | 73/46 |
| 4,061,015 | 12/1977 | Rish | 73/49.5 |
| 4,067,228 | 1/1978 | Elle et al. | 73/49.1 |
| 4,081,990 | 4/1978 | Chatagnier | 73/40.5 R |
| 4,083,230 | 4/1978 | Rome, Sr. et al. | 73/40.5 R |
| 4,090,405 | 5/1978 | Hawk et al. | 73/46 |
| 4,132,111 | 1/1979 | Hasha | 73/46 |
| 4,133,095 | 1/1979 | Lewis et al. . | |
| 4,136,552 | 1/1979 | Hasha | 73/46 |
| 4,152,924 | 5/1979 | Mayo | 73/40.5 |
| 4,152,926 | 5/1979 | Hasha | 73/46 |
| 4,185,492 | 1/1980 | Hauk et al. | 73/46 |
| 4,244,208 | 1/1981 | Hauk et al. | 73/46 |
| 4,254,655 | 3/1981 | Keast et al. | 73/49.5 |
| 4,272,985 | 6/1981 | Rapson, Jr. et al. | 73/49.2 |
| 4,326,406 | 4/1982 | Smith | 73/49.1 |
| 4,407,171 | 10/1983 | Hasha et al. | 73/46 |
| 4,416,147 | 11/1983 | Hasha | 73/49.6 |
| 4,429,566 | 2/1984 | Armell et al. | 73/40.7 |
| 4,458,521 | 7/1984 | Pilette | 73/46 |
| 4,646,559 | 3/1987 | Toelke | 73/46 |
| 4,673,652 | 6/1987 | McStravick et al. | 436/2 |
| 4,838,073 | 6/1989 | Jansch | 73/40.7 |
| 4,876,884 | 10/1989 | Jansch | 73/49.1 |
| 4,926,680 | 5/1990 | Hasha et al. | 73/46 |
| 5,209,105 | 5/1993 | Hasha et al. | 73/49 |

| | | |
|---|---|---|
| 5,255,559 | 10/1993 | Jansch .......................................... 73/46 |
| 5,461,905 | 10/1995 | Pennisson ................................... 73/46 |

FOREIGN PATENT DOCUMENTS

| | | |
|---|---|---|
| 1152560 | of 1963 | Germany . |
| 224117 A1 | of 1985 | Germany . |
| 58-21134 | of 1981 | Japan . |
| 1182326 | of 1985 | U.S.S.R. . |
| 1298563 A1 | of 1987 | U.S.S.R. . |
| 2055210 | of 1979 | United Kingdom . |
| 2056091 | of 1979 | United Kingdom . |
| 2129948 | of 1979 | United Kingdom . |
| 2163789 | of 1984 | United Kingdom . |
| 2237393 | of 1989 | United Kingdom . |

OTHER PUBLICATIONS

Products & Services Catalog, Weatherford, 1994, p. 6.

Helium Sniffer Finds Casing Joint Leaks, The Oilman, Jun. 1985, p. 68.

Standard Guide For The Selection of A Leak Testing Method, ASTM E432–71, 1981.

Standard Test Methods For Leaks Using The Mass Spectrometer Leak Detector Or Residual Gas Analyzer In THe Tracer Probe Mode, ASTM E498–73, 1980.

Standard Methods of Testing For Leaks Using The Mass Spectrometer Leak Detector In The Inside–Out Testing Mode, ASTM E493–73, 1980.

Standard Methods Of Testing For Leaks Using The Mass Spectrometer Leak Detector In The Detector Probe Mode, ASTM E499–73, 1980.

Gator Hawk External Connection Tester For Tubing Casing, Weatherford, 1994.

Testing of Gas Tight Joints Under Extreme Conditions, Marx, SPE, 1982.

A New Helium Sniffing Device For Locating Very Fine Leaks, Mura Kami et al, J. Vac. Sci. technol. A2(4), Oct-.–Dec. 1984 pp. 1589–1591.

Hell On Leaks, Loomis Int'l Inc., 1994.

Gator Hawk, Inc. Gator Hawk, Inc., 1994.

XLD External Leak Detector, World Wide Oil Tools, Inc., 1994.

*Primary Examiner*—Michael Brock
*Attorney, Agent, or Firm*—Guy McClung

[57] ABSTRACT

A method for testing threaded joints and threaded members comprising the steps of lubricating one or both threaded members, making up a joint, subjecting the joint to a pressure differential, and attempting to detect flow through said joint, characterized in that said method includes the step of subjecting said joint to heat during the test.

5 Claims, 4 Drawing Sheets

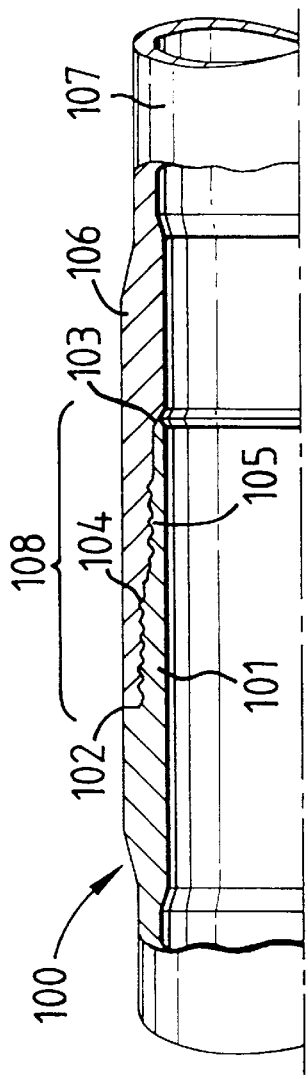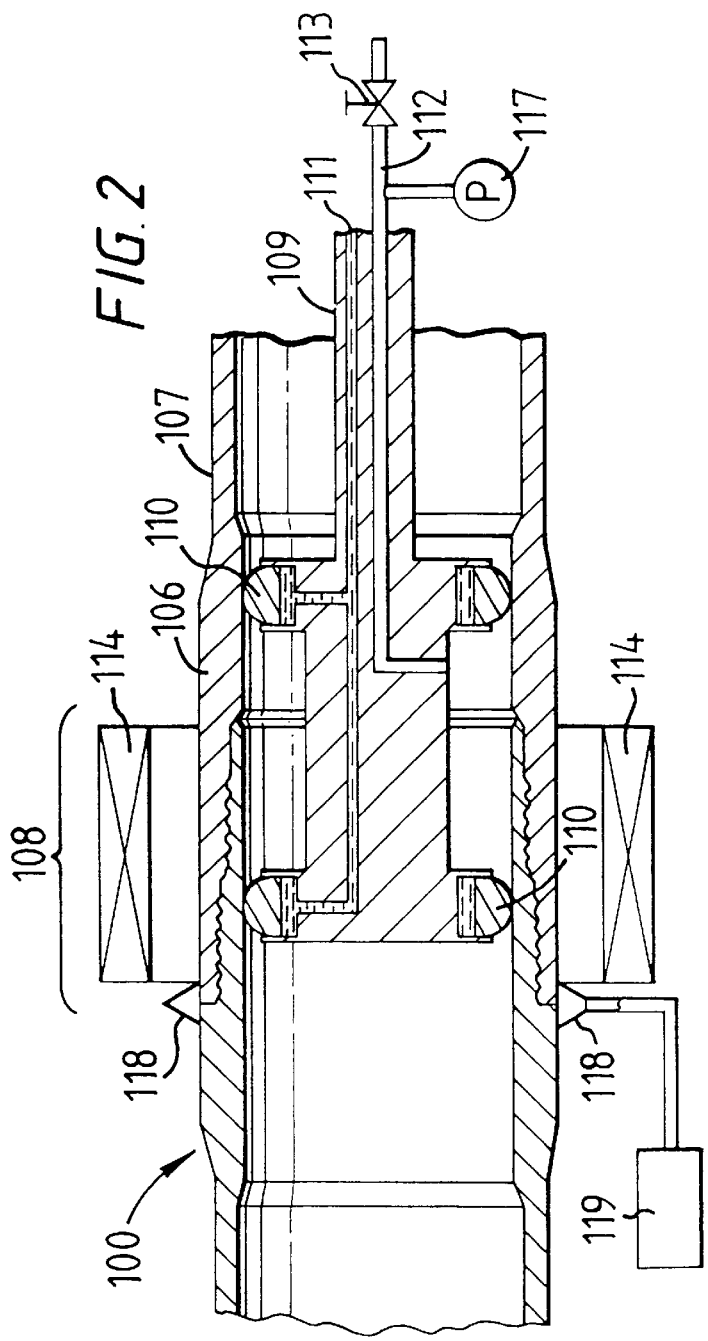

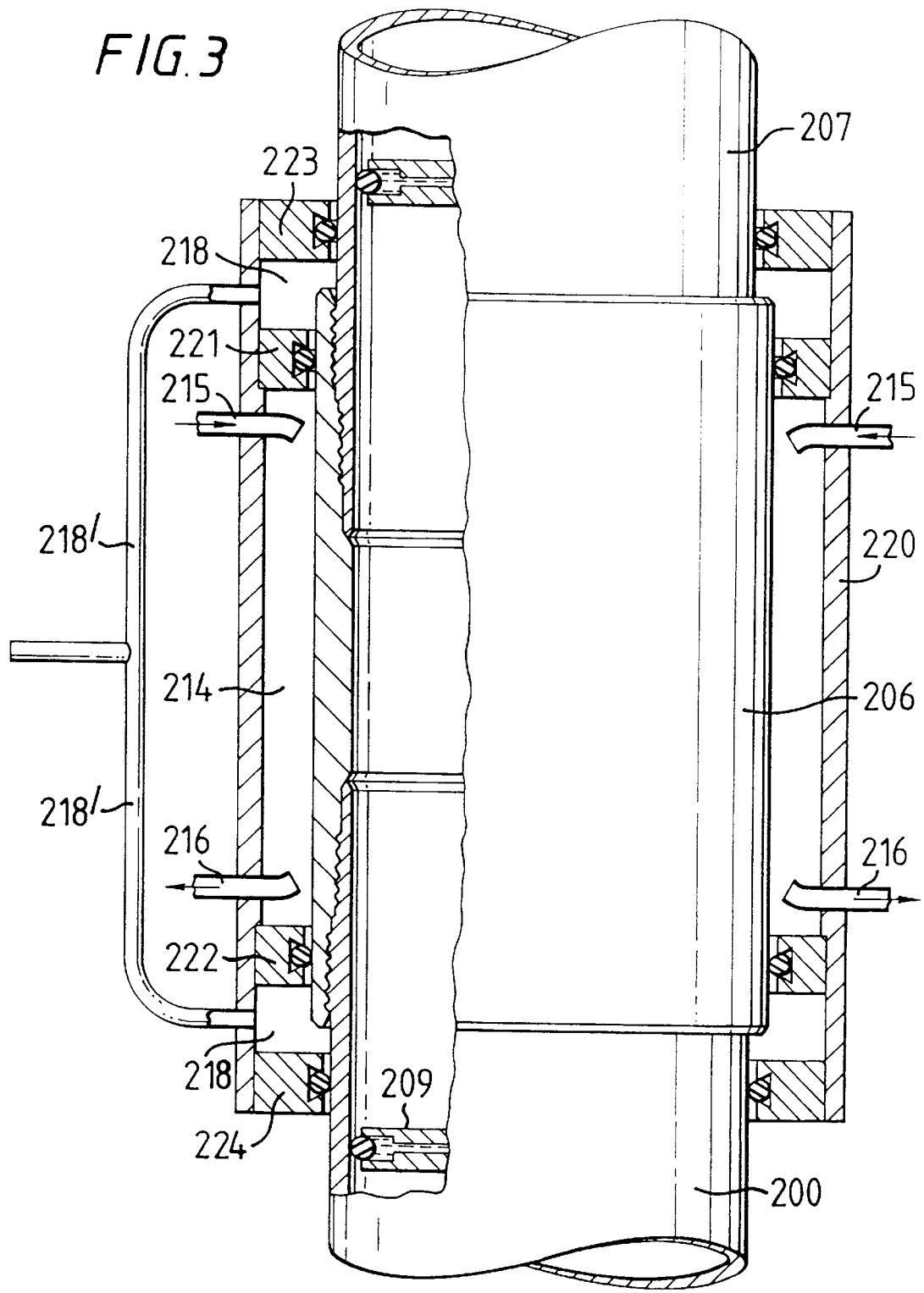

METHOD AND APPARATUS FOR TESTING THREADED JOINTS AND THREADED MEMBERS

This invention relates to a method and apparatus for testing threaded joints and threaded members.

Typically, tubulars used in the construction of oil and gas wells are joined via threaded members. It is often extremely important that the threaded joints do not leak and it is becoming increasingly common for threaded members, for example the pins and boxes on tubulars, and sockets for joining tubulars, to be tested (1) during production; (2) before being dispatched from a depot; and (3) as the tubular string is made up and lowered down a well.

A wide variety of testing methods are available. In factories and depots the majority involve lubricating one or both threaded members, making up a dummy threaded joint, subjecting the dummy threaded joint to a pressure differential, and attempting to detect flow through the threaded joint. A similar method is used as a tubular string is made up and lowered down a well except that the final threaded joint is tested.

Lubrication is generally effected using a material which is usually referred to as "dope". This is a mandatory procedure specified by tubular manufacturers. The problem which arises is that the presence of the dope can result in threaded joints passing tests but subsequently leaking. It is believed that this phenomena is caused by the dope effectively plugging small defects for the duration of the test which is typically from 90 to 120 seconds. If the dope is not applied then the threads may be galled.

In a conference paper entitled "Gasdichte Gewindeverbinder Theorie und Praxis" (Gas tight screw couplings in theory and practice) delivered at Clausthal-Zellerfeld University on Apr. 15, 1988 to the German Society for Mineral Oil Techniques and Coal Chemistry, the authors, G. Wilken, E. Eide and P. Stoffels observed that hot joints were more likely to leak than cold joints. However, the authors did not make any comments as to how their observation might be used and, indeed, commercial testing procedures subsequently remained largely unchanged.

It is an aim of the present invention to reduce the probability of a joint wrongly passing a test and to enable faulty joints to be identified more rapidly than in conventional testing.

According to the present invention there is provided a method for testing threaded joints and threaded members, which method comprises the steps of lubricating one or both threaded members, making up a joint, subjecting said joint to a pressure differential, and attempting to detect flow through said joint, characterised in that said method includes the step of subjecting said joint to heat in order to reduce the viscosity of said lubricant.

The heat may be applied to the joint before, during or before and during testing. However, it is particularly advantageous to commence heating at the same time as pressure is applied to the joint.

During trials a joint with a very small mechanical defect which passed conventional testing was heated during testing and promptly failed. In another test a joint which had failed a few seconds before the end of conventional pressure testing was dismantled. The threaded members were cleaned and the joint remade using dope. When tested by a method in accordance with the present invention the joint failed after just 10 seconds. The joint was dismantled. The threaded member cleaned and the joint remade using dope. The first test was repeated and, again only failed a few seconds before the end of the conventional pressure test.

Heating may be effected by any suitable means. However, inductive heating is currently favoured. Alternative methods of heating include electrical resistance heating, steam heating, heating with hot air or vapour, or even the application of a bag or jacket containing a hot material which could be liquid, solid or gaseous.

The method of the present invention is primarily intended for testing a succession of threaded members and accordingly the present invention extends to repeatedly carrying out the method of the present invention, preferably at a rate of at least five and preferably at least ten tests per hour.

If desired the joint may be subjected to vibration during testing, for example at ultrasonic frequencies.

The present invention also provides an apparatus for testing a lubricated threaded joint, which apparatus comprises means for applying a test fluid (i.e. liquid and/or gas) under pressure to one side of a lubricated threaded joint, and means for detecting flow through said lubricated threaded joint, characterised in that said apparatus further comprises a heater arranged to be disposed directly circumjacent said lubricated threaded joint for heating said lubricated threaded joint to reduce the viscosity of lubricant in said lubricated threaded joint.

Preferably, said means for heating said threaded joint comprises an induction heater.

Advantageously, said apparatus is adapted to applying said test fluid under pressure to the inside of a joint. However, if desired, the apparatus could be adapted to apply said test fluid under pressure to the outside of the joint.

The means for detecting flow through the threaded joint may comprise, for example a pressure gauge communicating with the pressure applied to the joint. Leakage through the joints would be indicated by a fall in pressure. This technique would primarily be applicable for use when the test fluid is a liquid. An alternative means for detecting flow through the threaded joint could comprise a gas detector or mass spectrometer when the test fluid is a gas.

The test fluid may comprise a liquid or a gas, nitrogen or helium being recommended.

For a better understanding of the present invention reference will now be made, by way of example, to the accompanying drawings, in which:

FIG. 1 is a diagrammatic side elevation, partly in section, showing one tubular threadedly connected to another;

FIG. 2 is a view similar to FIG. 1 showing the joint being tested using one embodiment of an internal pressure tester;

FIG. 3 is a view similar to FIG. 2 showing a different type of joint being tested using another embodiment of an internal pressure tester;

Figure 4:
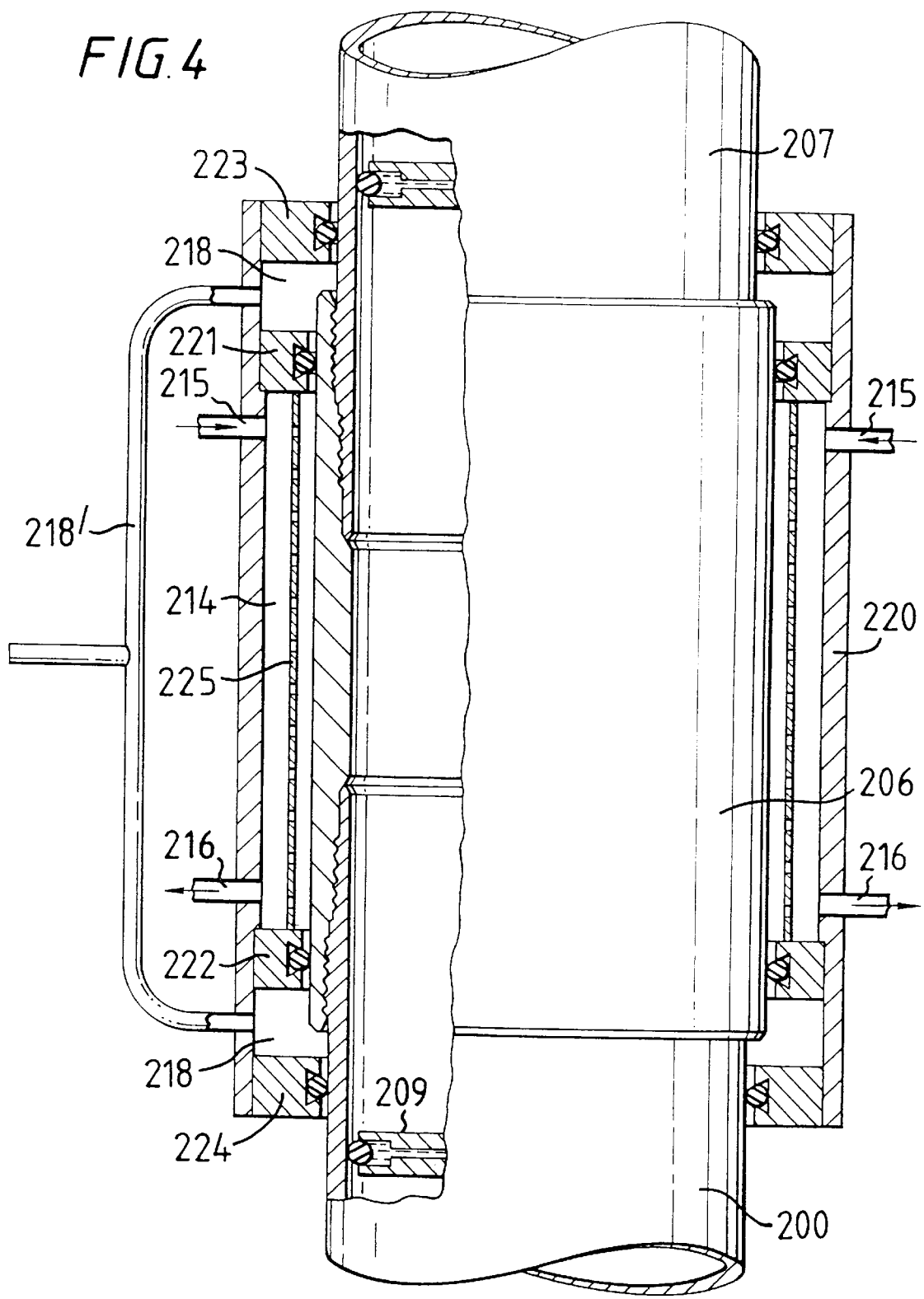
FIG. 4 shows a modification of the embodiment shown in FIG. 3.

Referring to FIG. 1, there is shown a tubular which is generally identified by the reference numeral 100. The tubular 100 is provided with a threaded pin 101.

There are a large number of different designs of pins. Some are designed to seal on first shoulder 102, some on second shoulder 103, and some on a combination of the first shoulder 102 and the second shoulder 103. Some have a centre shoulder 104, and some rely on interference between the threads 105.

In all cases the threaded pin 101 has to be correctly formed to seal properly.

In a factory the threaded pin 101 is tested by applying dope to the threaded pin 101 and screwing it into a threaded box 106 on a short tubular 107 (FIG. 2) which is secured in a vice (not shown).

The joint 108 is then tested to see whether any fluid can pass across the joint 108. In order to test the joint 108 an internal pressure tester 109 is inserted through the short tubular 107 and positioned as shown in FIG. 2.

Seals 110 are urged radially outwardly by introducing hydraulic fluid through pipe 111. Helium is then pumped through line 112 until the pressure reaches 1200 bar g as measured by pressure gauge 117 at which time valve 113 is closed. A collector 118 is disposed circumjacent the outside of the joint and is connected to a mass spectrometer 119 which draws in gas from the collector 118.

In conventional testing, once the helium has reached the test pressure, the joint 108 is left for 120 seconds and provided that no helium (or less than a specified amount of helium) is detected the joint is deemed acceptable.

The present invention differs in that immediately after the joint 108 is made up an induction heater 114 is moved into place circumjacent the threaded box 106 while the internal pressure tester 109 is being positioned and the seals 110 are activated.

The induction heater 114 is activated at the same time as valve 113 is opened to admit helium to the inside of the joint 108.

It is believed that the induction heater 114 heats the dope and lowers its viscosity, thus rendering it less capable of blocking a leak. In addition it is believed that any thermal expansion of the threaded box 106 relative to the tubular 100 will help expose any latent defect.

Typically, the outside of the threaded box, 106 should be heated to about 100° C. However, it is believed that the decrease in the viscosity of the dope consequent on heating is particularly important.

A useful advantage of the test procedure relates to pockets of air which may be trapped in the threads when the joint is made-up. In particular, such pockets of air can expand and distort a joint if it is subjected to a sufficiently high temperature down the wellbore. The test procedure described enables many small bubbles to escape thus inhibiting problems arising later.

The method of testing described with reference to FIG. 2 may also be used in a depot prior to dispatching new tubulars or refurbished tubulars. It may also be used for testing joints when running tubulars down a well.

FIG. 3 shows a method of testing which is generally similar to that described with reference to FIG. 2 except that the induction heater 114 is replaced by a steam chamber 214 which is disposed circumjacent the threaded box 206 and defined between the outer wall of the threaded box 206, a cylindrical member 220 and seals 221 and 222 which project inwardly from the cylindrical member 220 into sealing engagement with the threaded box 206.

In use, after the internal pressure tester has been positioned as shown helium is introduced into the inside of the threaded box 206. Simultaneously, superheated steam is introduced into the steam chamber 214 via inlets 215. Air, condensate and some steam leave the steam chamber 214 via outlets 216. Should the joint fail helium will pass into one or both the annular collectors 218 and will be sucked into a mass spectrometer (not shown) via hoses 218'. It will be noted that one of the annular collectors 218 is defined between one end of the cylindrical member 220, the seal 221 and a seal 223 which extends from the cylindrical member 220 to the outer wall of the tubular 207. The other annular collector 218 is defined between the other end of the cylindrical member 220, the seal 222 and a seal 224 which extends from the cylindrical member 220 to the outer wall of the tubular 200.

The embodiment shown in FIG. 4 is generally similar to the embodiment shown in FIG. 3 except that the steam chamber 214 is provided with a perforated cylinder 225 to help distribute the superheated steam more evenly over the circumference of the threaded box 206.

Figure 5:
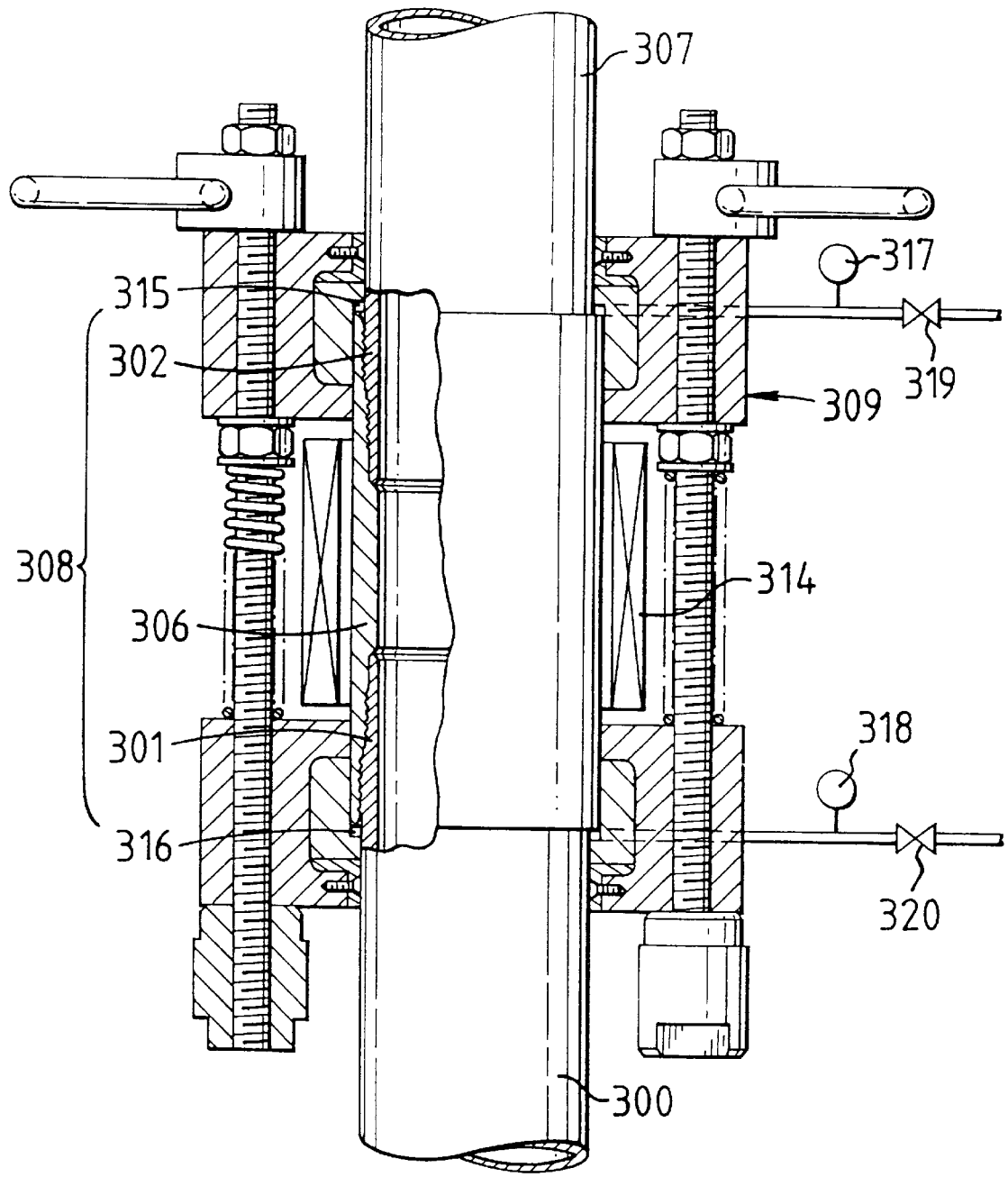
FIG. 5 is a cross-section showing a joint being tested by an external pressure tester during the running of casing into a well.

Referring now to FIG. 5 there is shown an external pressure tester which is particularly useful for testing joints when running casing down a well.

In use a length of casing 300 is held by slips (not shown). The casing 300 has an upwardly extending threaded pin 301 on which is mounted a threaded box 306. The threaded box 306 is normally mounted on the pin 301 at the factory or depot.

The inside of the upper portion of the socket 306 is coated with dope and the pin 302 of a tubular 307 is inserted therein. The joint 308 is then tightened to the required torque by a tong (not shown).

The external pressure tester, which is generally identified by reference numeral 309 is then applied to the joint 308. The external pressure tester is generally similar to that shown in U.S. Pat. No. 5,255,559 except that it also includes an induction heater 314.

As soon as the external pressure tester 309 is clamped in position the induction heater 314 is activated. Simultaneously, helium is introduced into chambers 315 and 316 until the pressure reaches 1200 bar g as measured by pressure gauges 317 and 318 respectively. At this time valves 319 and 320 are closed.

The intake of a gas detector (not shown) is disposed inside the tubular 307 in the vicinity of the threaded box 306. If less than a specified amount of helium is detected in a given time the joint is deemed satisfactory, the tubular lowered down the well and the process repeated.

If the joint is found to be unacceptable it is either remade or replaced as required.

Laboratory experiments have been conducted by the Applicants with apparatus similar to that shown in FIGS. 1 and 2.

In particular, a small notch was cut in the seal area 103 of a 14 cm (5½ inch) NEW VAM joint in order to simulate a defect. A small hole was then drilled into the box 106 and terminated at a position immediately adjacent the thread. A thermocouple was inserted in the small hole which was then packed with sealing wax.

Before each test the threaded pin 101 and threaded box 106 were cleaned thoroughly and a measured quantity of dope was applied evenly to the threads of the threaded box 106 using a Weatherford "AccuKote" dope applicator. The connection was subsequently made up to the torque value specified by the pipe manufacturers using a computer controlled (JAM) makeup system in association with a Weatherford model 7.6 hydraulic power tong with a free-floating backup.

An internal pressure tester 109 was inserted through the tubular 107 and positioned as shown in FIG. 2. The seals 110 were urged radially outwardly by introducing hydraulic fluid through line 112. Collector 118 was disposed circumjacent the outside of the joint and was connected to a mass spectrometer 119 which drew in gas from the collector 118.

At the commencement of each test helium was admitted to the inside of the joint via line 112 and, simultaneously, power was applied to the induction heater 114. Power was applied to the induction heater 114 for varying lengths of time and the temperature at the thermocouple recorded when the power to the induction heater 114 was switched off.

The results of the tests were as follows:

| Test | Weight of Dope (g) | Temperature (° C.) | Time to Detection of Failure (s) | Test Pressure (bar g) |
|---|---|---|---|---|
| 1 | 10 | 26 | 5 | 400 |
| 2 | 20 | 80 | 45 | 400 |
| 3 | 70 | 26 | 120 | 400 |
| 4 | 70 | 26 | 180 | 400 |
| 5 | 70 | 90 | 20 | 400 |
| 6 | 70 | 100 | 3 | 200 |
| 7 | 80 | 26 | 300 | 400 |
| 8 | 80 | 60 | 25 | 400 |
| 9 | 80 | 80 | 50 | 400 |

The manufacturer's recommendations are that approximately 20 g of dope should be used on this type of joint. However, in practice, unless a special applicator is used field measurements suggest that field operatives typically apply between 70 and 80 g of dope per joint. For this reason many of the tests were carried out with this quantity of dope.

As can be seen, with minimal dope (Test 1) the defect became apparent very rapidly at ambient temperature. However, with 70 g of dope, at ambient temperature, the defect did not become apparent for 120 s (Test 3) and 180 s (Test 4) respectively. Such a defect would probably have gone unnoticed in conventional commercial pressure testing which typically rarely exceeds two minutes. However, it will be noted that when heating was applied to raise the temperature to 90° C. and 100° C. the defect became apparent in 20 and 3 seconds respectively (Test 5 and 6).

Test 7 demonstrates how a generous (80 g) application of dope prevented detection of the defect for 300 s at 80° C. However, when the joint was heated to 60° C. and 80° C. the defect was detected at 25 s and 50 s respectively (the latter result reflecting the degree of variation observed).

Test 2 shows that with the correct amount of dope applied the defect would have been detected in just 45 s at 80° C. From Test 6 it can be reasonably assumed that the time to detect the defect would be significantly less at 100° C.

The results indicate that by selecting appropriate temperatures it should be possible to detect defects which would probably have gone unobserved during conventional commercial pressure testing lasting 90 to 120 s in under 45 s.

The laboratory tests indicate that, in the field, it should be possible to routinely test 15 to 20 joints per hour when running casing and possibly more with a good rig crew.

Various modifications to the embodiments described are envisaged. For example, liquid can be used as the test fluid. In this case leakage is detected by noting a drop of pressure at the pressure gauges. If desired, the induction heater 124 or the steam chamber 214 may comprise two parts which are hinged together and which can be mounted around a joint.

I claim:

1. A method for testing threaded joints and threaded members, the method comprising lubricating with a lubricant one or both threaded members of two threaded members for forming a threaded joint, making up a threaded joint with the two threaded members, subjecting said threaded joint to a pressure differential, and testing said joint by attempting to detect flow through said joint, characterized in that said method includes the step of subjecting said joint to heat in order to reduce viscosity of said lubricant, and subjecting said joint to vibration at an ultrasonic frequency during said test, repeatedly carrying out said method to at least 5 joints per hour.

2. The method according to claim 1 characterized in that said heat is applied during testing.

3. The method according to claim 1 characterized in that said heating is effected by inductance.

4. The method according to claim 1 characterized in that said heating is effected by steam.

5. The method according to claim 1 when carried out at a rate of at least 10 joints per hour.

* * * * *